UNITED STATES PATENT OFFICE.

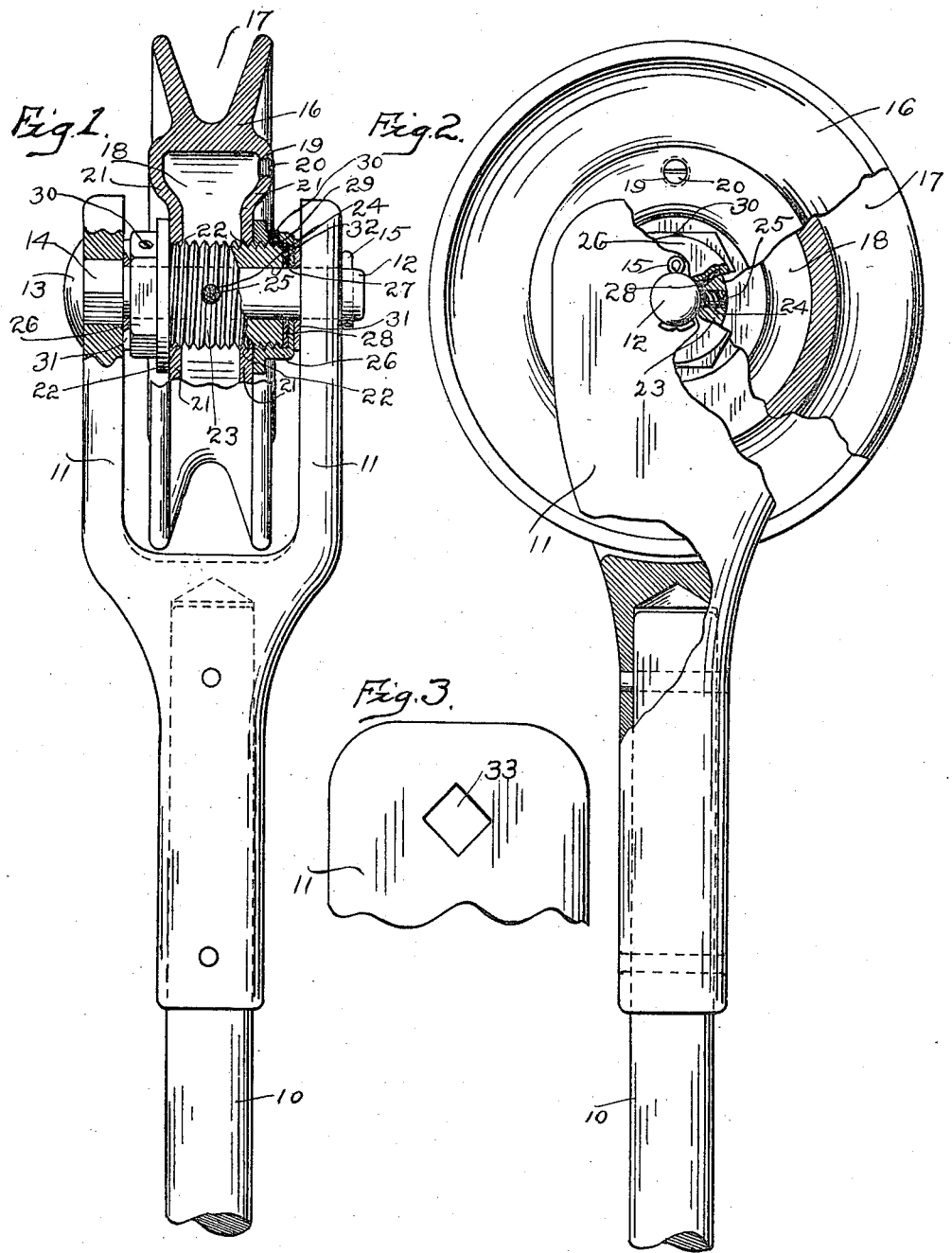

GEORGE H. MERWIN, OF MILFORD, CONNECTICUT.

SELF-OILING WHEEL.

987,810.  Specification of Letters Patent.  Patented Mar. 28, 1911.

Application filed December 29, 1909. Serial No. 535,431.

*To all whom it may concern:*

Be it known that I, GEORGE H. MERWIN, a citizen of the United States, residing at Milford, county of New Haven, State of Connecticut, have invented an Improvement in Self-Oiling Wheels, of which the following is a specification.

This invention has for its object to provide a self-oiling wheel adapted for general use and especially adapted for use as a trolley, which shall be complete in itself and adapted to be substituted for other wheels in harps already in use and which shall be simple and inexpensive to produce and thoroughly durable.

With these and other objects in view I have devised the novel self-oiling wheel which I will now describe, referring to the accompanying drawing forming a part of this specification and using reference characters to indicate the several parts.

Figure 1 is an elevation, partly broken away, showing my novel self-oiling wheel in place in a trolley harp; Fig. 2 an elevation, partly broken away, as seen from the right in Fig. 1; and Fig. 3 is a detail side view of the upper end of a trolley harp.

For convenience in illustration and description I have shown the invention as applied to a trolley.

10 denotes a trolley pole and 11 a trolley harp which may be of any ordinary or preferred construction.

My novel wheel is mounted to rotate on a bearing stud indicated by 12 which extends between the arms of the harp. The stud is shown as provided in one end with a head 13 and below the head with an angular portion 14 which engages a correspondingly shaped opening 33 in the arm of the harp to lock the stud against rotation, the other end of the stud passing through the other arm of the harp and being secured in place in any suitable manner as by a cotter pin 15.

16 denotes the body of the wheel which is provided with the usual groove 17 to receive a current wire and is cast with a central recess 18 which serves as an oil reservoir and is filled after the wheel is set up through an opening 19 shown as closed by a screw plug 20.

The side walls of the wheel, indicated specifically by 21, are provided with central threaded holes 22 which receive a threaded hub 23. This hub is provided with a longitudinal hole 32 to receive the bearing stud, and with a radial hole 24 communicating therewith in which a wick 25 may be placed, the wick taking up oil from the reservoir and conveying it to the bearing stud.

The wheel is centered upon the hub by means of screw caps 26 which are turned on from the opposite ends of the hub, the screw caps being provided with central holes 27, through which the bearing stud passes, and with suitable packing 28 which makes a stuffing box of each screw cap. The screw caps may be locked against the possibility of displacement in any suitable manner as by blocks of soft metal, indicated by 29, which are pressed against the threads of the hub by screws 30.

31 indicates washers which may be placed between the outer faces of the screw caps and the inner faces of the arms of the harp if required.

The operation will be readily apparent from the drawing.

As already stated, the wheel is wholly independent of the harp and the bearing stud and may be assembled and shipped ready for use. After placing the wheel in the harp and securing the bearing stud the wheel may be filled with oil at opening 19 and is then ready for use. In assembling the wheel, a wick is placed in hole 24 in the hub, then the hub is turned into the openings in the side walls and packing is placed in the screw caps which are then turned on to the ends of the hub, the wheel being properly centered on the hub and then locked in place by turning the screw caps up against the side walls, after which the screw caps may be locked in place to prevent the possibility of their starting away from the body and thereby causing leakage of oil. In practice, the packing in the screw caps prevents the escape of any oil whatever so that my novel wheel while perfectly self-oiling is very economical, may be used so far as the bearing is concerned for an almost unlimited length of time and is free from oil externally.

Having thus described my invention I claim:

1. A wheel of the character described comprising a body provided with a central chamber and side walls having threaded openings, a hub threaded throughout its length and adjustably engaging the threads of said openings, whereby said body may be accurately positioned on said hub, said hub having an opening communicating with the chamber of said body, screw caps inclosing the ends of said hub and having end walls abutting said ends, said caps being provided with annular flanges bearing against the sides of said body, and means for locking each cap against rotation relative to said hub.

2. A wheel of the character described comprising a body provided with a central chamber and side walls having threaded openings, a hub threaded throughout its length and adjustably engaging the threads of said openings, whereby said body may be accurately positioned on said hub, said hub having an opening communicating with the chamber of said body, screw caps inclosing the ends of said hub and having end walls abutting said ends, said caps being provided with annular flanges bearing against the sides of said body, and means for locking each cap against rotation relative to said hub, a supporting stud extended longitudinally through said hub and caps, and means for preventing rotation of said stud.

In testimony whereof I affix my signature in presence of two witnesses.

GEORGE H. MERWIN.

Witnesses:
A. M. WOOSTER,
S. W. ATHERTON.

Copies of this patent may be obtained for five cents each, by addressing the "Commissioner of Patents, Washington, D. C."